Sept. 20, 1971  L. E. CANCEL  3,605,834
COCONUT BREAKING MACHINE
Filed June 5, 1969
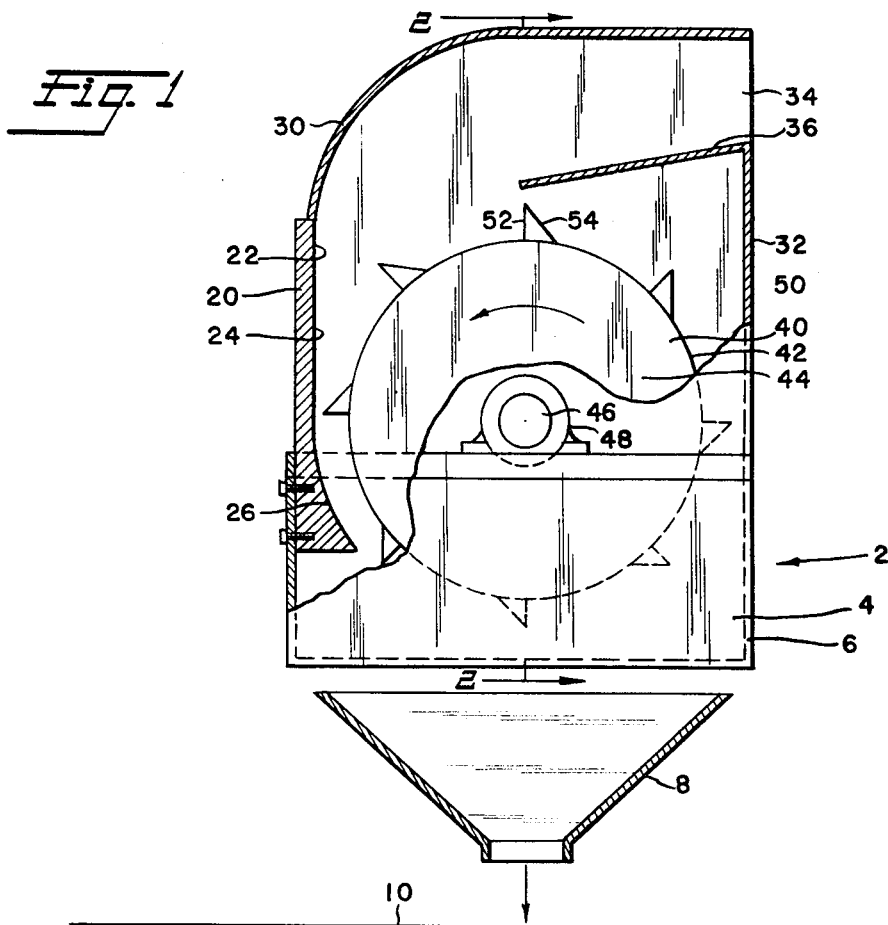
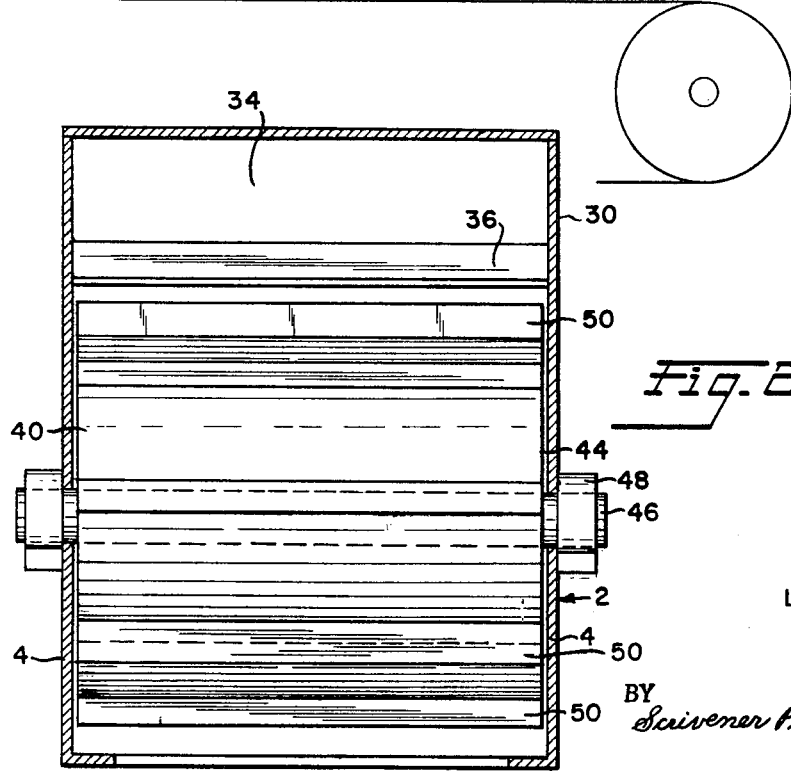
INVENTOR
LUIS E. CANCEL
BY Scrivener Parker Scrivener & Clarke
ATTORNEYS × # United States Patent Office 3,605,834
Patented Sept. 20, 1971

3,605,834
COCONUT BREAKING MACHINE
Luis E. Cancel, San Juan, Puerto Rico, assignor to the Commonwealth of Puerto Rico
Filed June 5, 1969, Ser. No. 830,621
Int. Cl. A23n 5/04
U.S. Cl. 146—7                                              1 Claim

ABSTRACT OF THE DISCLOSURE

A machine for breaking, without crushing, the nut of a coconut, comprising a fixed smooth pressure plate and a rotating cylindrical drum the axis of which is parallel to the pressure plate. The drum has a smooth surface spaced from the pressure plate a distance less than the diameter of the coconut and is provided with axially extending slats which are spaced apart a distance greater than the diameter of the coconut, and which co-operate with the pressure plate and the surface of the drum to provide pockets within each of which a coconut is positioned to be pressed between the pressure plate and drum.

DESCRIPTION OF THE DRAWINGS

FIG. 1 is a side elevational view of a machine according to the invention, and
FIG. 2 is a sectional view taken on line 2—2 of FIG. 1.

DESCRIPTION OF THE INVENTION

A coconut in its natural state, as it is harvested from the tree, has a tough outer husk which surrounds the nut itself, and which must be removed to expose the useful nut. The means for removing the husk does not form any part of this invention. The nut consists of the internal hollow sphere of meat which is known as the endosperm and which is covered by a brown thin cuticle known as the testa which, in turn, is surrounded by a hard shell known as the endocarp. The nut, by which is meant all parts except the enclosing husk, normally ranges from four to seven inches in diameter and the meat is usually in the order of one-half inch thick. The meat is strongly adhered to the testa and endocarp and considerable difficulty is encountered in separating the meat from these parts. The nut cannot be crushed, as this produces many small pieces which enter the meat and ruin it for use. To successfully remove the meat and then separate it from the testa and endocarp it is necessary to break the coconut into relatively large pieces, and it is the particular object of the present invention to provide a machine for doing this.

An embodiment of the machine provided by the invention is disclosed in the drawings and comprises a framework or body 2 having end walls 4, side walls 6 and open top and bottom. This framework may be positioned on and attached to the floor or any suitable table or support. A funnel 8 is disposed centrally beneath the body 2 and its open lower end overlies a movable conveyor belt 10. A pressure plate 20 is positioned within the body framework and adjacent one side wall thereof and has a smooth surface 22 facing the interior of the body framework and extending upwardly from the bottom of the body framework with its upper edge substantially above the top of the framework. This pressure plate is rigidly fixed to the framework of the body and is supported in such a way that it will not be moved by high pressures exerted on the flat surface 22. The upper part 24 of surface 22 is flat and vertical, while the lower part 26 is curved inwardly toward the interior of the body framework. The upper flat part of the pressure plate joins the lower curved part thereof at approximately the level of the upper surface of the body 2, and both parts of the pressure plate extend from end wall to end wall of the body. A shroud 30 extends upwardly from the upper edge of the pressure plate and then forwardly toward a side wall 6 to terminate substantially above the top of the body. The shroud has a vertical front wall 32 the upper edge of which is disposed below the forward edge of the shroud to provide an opening 34 which is of sufficient size to admit the nut of a coconut. A plate 36 extends inwardly of the shroud from the upper edge of front wall 32 for supporting and guiding a coconut introduced into the machine through opening 34. The machine may be of any desired length and may be constructed to admit only one coconut at a time or, alternatively, may be of such length that a number of coconuts may be admitted in side-by-side relation through opening 34.

Means are provided by the invention for co-operating with pressure plate 20 and other parts of the machine to cleanly break, without crushing, a coconut introduced into the machine through opening 34. Such means comprise a drum 40 having a smooth cylindrical surface 42 and end walls 44. The drum is mounted on an axle 46 which is journaled in bearings 48 mounted on the upper surfaces of end walls 4 so that the axis of the drum is parallel to the pressure plate 20. The parts are so constructed and arranged that the spacing between the surface of the curved plate 26 and the surface 42 of the drum is less than the minimum diameter of the normal nut of a coconut and therefore is less than four inches and this spacing is constant as these two parts are concentric. The spacing between the surface of the drum and the flat vertical face 22 of the pressure plate increases from the upper edge of the curved part of the pressure plate with increasing height of the flat face. Fixed to the surface 42 of the drum and extending axially from end to end thereof are a plurality of slats 50, each of which is of generally triangular cross sectional shape, having, in the direction of rotation of the drum shown by the arrow in FIG. 1, a generally radial leading surface 52 and a rearwardly inclined trailing surface 54. These surfaces are constructed and arranged in this way, and the vanes are strongly and rigidly attached to the drum, to exert maximum force on a coconut being processed by the machine without possibility of breaking the vane from the drum. The distance between the leading face 52 of each vane and the trailing edge 54 of the next vane in the direction of rotation of the drum is equal to the arcuate length of the smooth, inward surface of the lower curved part 26 of the pressure plate.

In the use and operation of the machine the drum is rotated by any suitable motive means and the coconuts to be processed are introduced through opening 34, being guided to the operating parts of the machine by guide plate 36. When the coconut reaches the end of this plate it drops therefrom onto the rotating surface of the drum and is immediately engaged by the leading surface 52 of one of the slats 50 and propelled toward the smooth, flat surface 22 of the upper part of the pressure plate. The space formed by each pair of adjacent slats, the surface of the drum and the pressure plate forms a pocket which progressively decreases in size as it moves with the rotating drum. Each of these pockets receives a whole coconut and forces it into a progressively decreasing space thereby breaking it into large pieces by pressure alone and entirely without crushing. This pressure action has the added advantage and result of loosening the meat from the testa and endocarp due to the difference in the natural elasticities of the meat and these other parts. The broken pieces of the nut which are produced by the machine fall through the open bottom of the framework and are guided by the funnel 8 to the moving conveyor belt 10 for removal to a station for further processing.

What is claimed is:

1. A machine for breaking the nut of a coconut by the application of pressure, comprising a pressure plate having a smooth surface having a substantially vertical planar upper part and a lower part which is curved out of the plane of the upper part, a rotatable cylindrical drum the axis of which is parallel to the surface of the pressure plate, means for rotating the drum, the drum having an unbroken cylindrical exterior surface which is concentric with the curved lower part of the pressure plate and is spaced therefrom by a distance less than the spacing between the exterior surface of the drum and the vertical upper part of the pressure plate whereby a downwardly extending passage of decreasing width is provided between the exterior surface of the drum and the pressure plate the minimum width of which is less than the minimum normal diameter of the nut of a coconut, the exterior surface of the drum having fixed thereto a plurality of slats extending axially of the drum and being spaced circumferentially of each other a distance greater than the minimum normal diameter of the nut of a coconut.

References Cited

UNITED STATES PATENTS

| 1,611,794 | 12/1926 | Vaughan | 146—11 |
| 1,683,004 | 9/1928 | Voigt | 146—11 |

FOREIGN PATENTS

| 25,98 | Ad. 1914 | Great Britain. |

WILLIE G. ABERCROMBIE, Primary Examiner